May 10, 1960 C. E. BERRY 2,936,423
STABILIZED D.C. AMPLIFIER
Filed Aug. 13, 1956
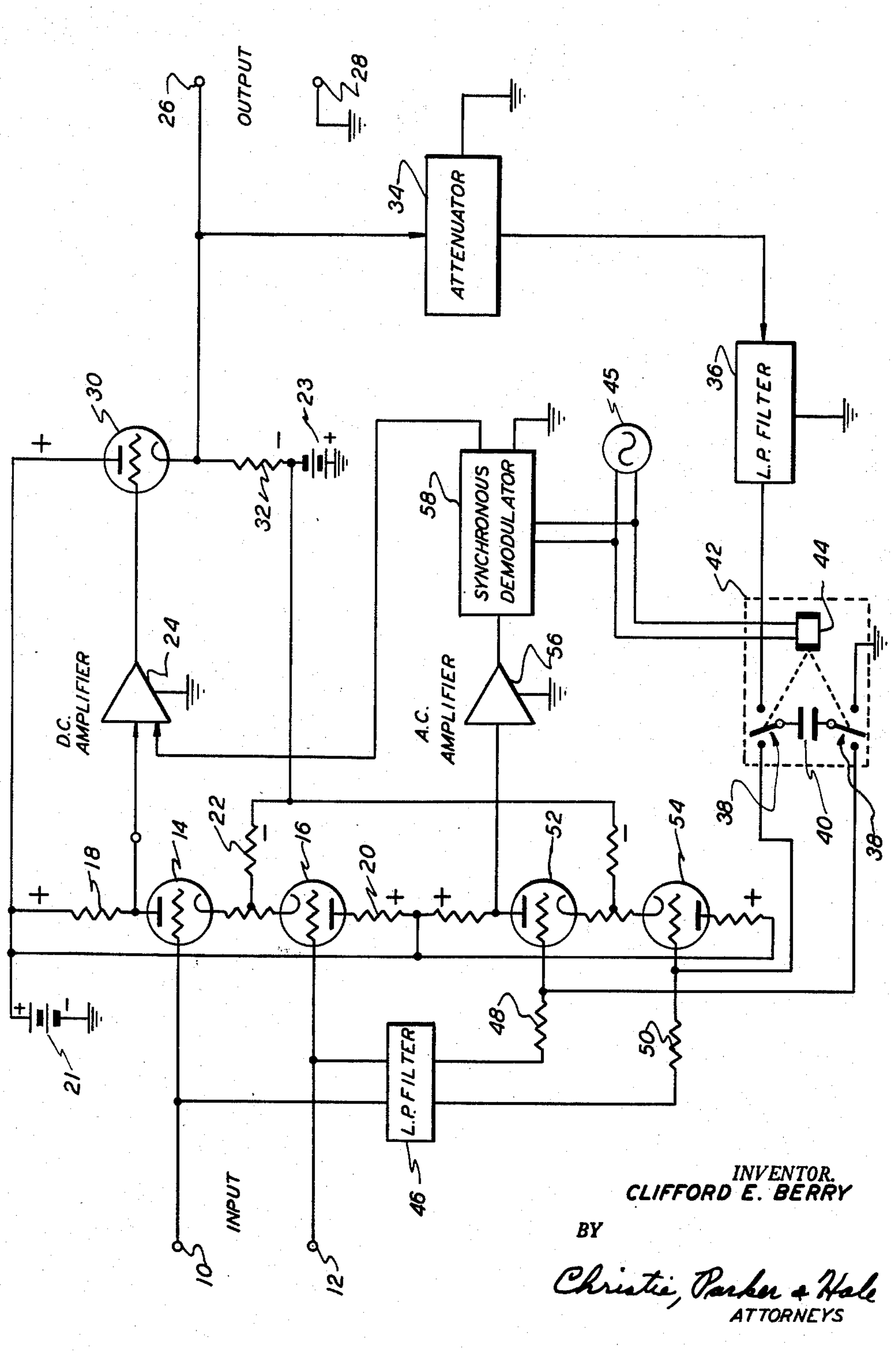
INVENTOR.
CLIFFORD E. BERRY
BY
Christie, Parker & Hale
ATTORNEYS 2,936,423
Patented May 10, 1960

2,936,423

STABILIZED D.C. AMPLIFIER

Clifford E. Berry, Altadena, Calif., assignor to Bell & Howell Company, Chicago, Ill., a corporation of Illinois Application August 13, 1956, Serial No. 603,602
4 Claims. (Cl. 330—9)

This invention relates generally to direct current amplifiers, and more particularly, is concerned with a chopper-stabilized differential amplifier.

The problem of drift in D.-C. amplifiers, both short term and long term drift, is well known, and various circuits have heretofore been proposed for stabilizing the D.-C. amplifier to minimize these drifts. One technique which has been successfully employed in single-ended amplifiers, i.e. amplifiers having both their input and output referenced to ground potential, has been the use of a chopper to alternately sample the input and output and use the sample difference to control the operating or zero point of the amplifier so that with zero input voltage, the output is zero. Where both the input and output are referenced to ground potential, comparison of the input and output by the chopper is readily accomplished.

However, in many measurements applications, it is not readily possible to have one side of the input at ground potential. For example, the input to the amplifier may be derived across one diagonal of a bridge circuit while one end of the opposite diagonal is grounded. Thus the voltage to be measured and applied across the input to the D.-C. amplifier is floating with respect to the ground reference potential. In such case the general practice is to use a differential amplifier. Since the input is floating with respect to ground, a direct comparison of the output to the input by means of a chopper has not been used heretofore for stabilizing a differential amplifier.

In accordance with the present invention stabilization of a D.-C. differential amplifier is accomplished by means of a chopper, even though the input to the differential amplifier is floating with respect to ground potential. This is achieved by means of a storage capacitor which is alternately connected across a first potential proportional to the input signal and then to a second potential proportional to the output signal. Both ends of the storage capacitor are switched by the chopper, so that the capacitor acts as a means for comparing potential differences regardless of the absolute potentials of the two differences being compared.

In brief, the invention contemplates a circuit including a first differential amplifier stage connected to the input terminals, followed by a constant gain direct-coupled amplifier and cathode follower coupled to the output terminals. Means including a low-pass filter derives a first potential proportional to the voltage across the input terminals, and means including an attenuator and a low-pass filter derives a second potential proportional to the voltage appearing across the output terminals. A double-throw double-pole chopper switch alternately connects the two ends of a storage capacitor across the input and the output derived potentials. The storage capacitor is coupled through a differential amplifier and an alternating current amplifier, to a synchronized demodulator circuit, which is synchronized with the chopper. The output of the demodulator is coupled to the bias control of the first stage of the D.-C. amplifier, whereby the zero point of the amplifier output is controlled in response to differences in the first and second potentials.

For a better understanding of the invention reference should be had to the accompanying drawing, wherein the single figure is a schematic diagram of the amplifier circuit of the present invention.

Referring to the figure in detail, a D.-C. input signal, which is at a floating potential with respect to ground, is applied across a pair of input terminals 10 and 12. For example, the input may be derived across a diagonal of a bridge with the other diagonal having a fixed potential referenced to ground applied thereto. The input terminals are directly coupled to the control grids of a pair of triodes 14 and 16 comprising a single stage differential amplifier. The differential amplifier stage includes a pair of plate load resistors 18 and 20 which couple the plates of the respective triodes 14 and 16 to a suitable B+ supply 21. The cathodes of the triodes 14 and 16 are connected through a common bias resistor 22 to a B— source 23. The resistance 22 is quite large to provide a substantial constant current source, as required to provide a suitable differential amplifier.

The plate of the triode 14 is directly coupled to the input of a single-ended input D.-C. amplifier 24. Because the total cathode current of the differential amplifier stage is constant, changes in the average level of the input with respect to ground affect the plate voltage of the triode 14 by a negligible amount. The output of the amplifier 24 is coupled to a pair of output terminals 26 and 28 through a cathode follower circuit including a triode 30, the plate of which is connected to the B+ supply 21 and the cathode of which is connected to the B—supply 23 through a load resistor 32. The output terminal 26 is connected to the cathode of the cathode follower triode 30 and the output terminal 28 is connected to a grounded reference common to the D.-C. amplifier 24.

In order to maintain the output voltage across the terminals 26 and 28 constant with a constant input voltage across the input terminals 10 and 12, regardless of drift in the several stages of amplification, the output voltage is connected to an attenuator 34 and low-pass filter 36 to one pair of terminals of a double-throw double-pole switch indicated generally at 38. The switch 38 connects the attenuated version of the output voltage across a storage capacitor 40 when the switch is thrown in one direction. The switch 38 is part of a synchronous chopper, indicated generally at 42, which is driven by means of a coil 44 connected to an alternating current source 45.

The chopper switch 38 when thrown to its opposite position connects the capacitor 40 across a voltage derived from the input terminals 10 and 12. To this end the input terminals are connected to a low-pass filter 46 and through a pair of isolating resistors 48 and 50 to the chopper switch 38. If the potential stored on the capacitor 40 produced by the signal derived from the output is not equal to the potential at the input, a voltage difference is produced across the resistors 48 and 50.

The resistors 48 and 50 are connected also to the control grids of a pair of triodes 52 and 54 comprising a single stage of a differential amplifier similar to the differential amplifier involving the triodes 14 and 16. The plate of the triode 52 is coupled to the input of an A.-C. amplifier 56, the output of which is fed to a synchronous demodulator 58. Any conventional demodulator circuit, such as a chopper or ring modulator, preferably having a single-ended output, may be used. The synchronous demodulator 58 is connected to the same alternating current reference source as the chopper 42.

The output from the demodulator 58 is utilized to control the bias of the input stage in the D.-C. amplifier 24.

In operation it will be seen that the storage capacitor 40 periodically samples the potential across the output. The resulting potential stored on the capacitor is then compared with the input voltage following each of the periodic samplings of the output. If any difference in potential exists between the input and the output, the potential on the grids of the triodes 52 and 54 will shift abruptly from the level set by the input to the charge level of the capacitor 40 when the capacitor 40 is connected across the grids. The isolation resistors 48 and 50 prevent the capacitor 40 from discharging or charging to the input potential during the time it is connected across the input. Thus a square wave is produced at the plate of the triode 52 having the same period as the reference alternating voltage applied to the chopper 42, the amplitude of the square wave and the phase of the square wave being indicative respectively of the difference in magnitude of the input and output voltages and their relative polarity. The output of the demodulator 58 is therefore a D.-C. voltage which varies in magnitude with changes in the output voltage not produced by changes in the input voltage. The output of the demodulator controls the bias on the input stage of the amplifier 24 to either reduce or increase the output voltage, so that the output from the attenuator 34 is made equal to and held equal to the magnitude of the input signal. It will be seen that the amount of attenuation of the attenuator 34 which is by definition always less than unity, should be equal to the reciprocal of the over-all gain between the input and the output of the amplifier to make the output of the attenuator substantially equal to the input to the amplifier.

The purpose of the low-pass filter 46 in the input is to reduce signals having the chopper frequency to such a level as to prevent zero shift due to rectification by the chopper. The low-pass filter 36 on the output is then necessary for proper transient response. The storage capacitor 40 should be made sufficiently small so that it does not disturb appreciably the low-pass filter 36 which connects it to the output. The resistors 48 and 50 are then made sufficiently large so that the capacitor 40 does not appreciably disturb the input filter 46.

From the above description it will be seen that a D.-C. amplifier is provided having a double-ended input and yet is stabilized against drift by a chopper-controlled feed back circuit. Thus the amplifier of the present invention is stabilized against drift regardless of the average potential level of the input signal relative to ground.

I claim:

1. A stabilized direct current amplifier circuit for coupling a pair of input terminals that are floating with respect to a ground reference potential to a pair of output terminals, one of which is at the ground reference potential, said circuit comprising a first differential amplifier stage connected to the input terminals, a direct-coupled amplifier connected to receive the difference signal from the differential amplifier and connected to the ground reference, means coupling the output of the direct-coupled amplifier to the output terminals, a storage capacitor, a double-pole double-throw chopper switch, means for deriving a first potential proportional to the potential appearing across the input terminals including a low-pass filter, means for deriving a second potential proportional to the potential appearing across the output terminals including attenuating means and a low-pass filter, the attenuating means having an attenuation substantially equal to the reciprocal of the gain produced by the circuit between the input and output terminals, the chopper switch alternately connecting the first and second potentials across the storage capacitor, a second differential amplifier stage, means for directly coupling said first potential to the second differential amplifier stage, an alternating current amplifier coupled to one output side of the second differential amplifier stage, a demodulator synchronized with the chopper switch coupled to the output of the alternating current amplifier, and means for controlling the zero point of the direct-coupled amplifier in response to the output of the demodulator.

2. A stabilized direct current amplifier circuit for coupling a pair of input terminals that are floating with respect to a ground reference potential to a pair of output terminals, one of which is at the ground reference potential, said circuit comprising a first differential amplifier stage connected to the input terminals, at least one direct-coupled amplifier stage connected to receive the difference signal from the differential amplifier and connected to the ground reference, means coupling the direct-coupled amplifier stage to said output terminals, a storage capacitor, means for deriving a first potential proportional to the potential appearing across the input terminals, means for deriving a second potential proportional to the potential appearing across the output terminals including attenuating means having an attenuation substantially equal to the reciprocal of the gain produced by the circuit between the input and output terminals, means for connecting the second potential across the storage capacitor for charging the capacitor to said second potential, a second differential amplifier stage, means for directly coupling said first potential to the second differential amplifier stage, means for periodically disconnecting both ends of the storage capacitor from the output of the means for deriving the second potential and connecting the ends of the capacitor across the input to the second differential amplifier stage, an alternating current amplifier coupled to receive the difference signal from the second differential amplifier stage, and a synchronous demodulator for coupling the output of the alternating current amplifier to the direct-coupled amplifier for biasing the amplifier to a fixed zero point.

3. A stabilized direct current amplifier circuit for coupling a pair of input terminals that are floating with respect to a ground reference potential to a pair of output terminals, one of which is at the ground reference potential, said circuit comprising a first differential amplifier stage connected to the input terminals, a direct-coupled amplifier stage connected to receive the difference signal from the differential amplifier and connected to the ground reference potential, the output of the direct coupled amplifier stage being coupled to the output terminals, a storage capacitor, means for deriving a first potential proportional to the potential appearing across the input terminals, means for deriving a second potential proportional to the potential appearing across the output terminals, means for connecting the second potential across the storage capacitor to charge the capacitor to said second potential, a second differential amplifier stage, means for directly coupling said first potential to the second differential amplifier stage, means for periodically disconnecting both ends of the storage capacitor from the output of the means for deriving the second potential and connecting the ends of the capacitor across the input to the second differential amplifier stage, an alternating current amplifier coupled to receive the difference signal from the second differential amplifier stage, and a synchronous demodulator for coupling the output of the alternating current amplifier to the direct-coupled amplifier stage for varying the bias of said stage whereby the zero point amplifier stage is controlled in response to differences in the first and second potentials.

4. A stabilized direct current amplifier circuit comprising direct current amplifying means including at least one stage having variable bias control, the amplifying means having a double-ended input and a single-ended output, a storage capacitor, means for deriving a potential between a pair of terminals in response to the output of the amplifying means, comparing means having first and second pairs of input terminals for deriving an output potential proportional to the difference between the input potentials applied to the first and second pairs of input terminals thereof, means for alternately connecting the ends of the storage capacitor to the terminals of the means for deriving a potential from the single-ended output of the amplifying means and to the first pair of input terminals of the comparing means, means for coupling the second pair of terminals of the comparing means to the double-ended input of the amplifying means, and means for varying the bias of said one stage of the amplifying means in response to the output potential derived from said comparing means.

References Cited in the file of this patent

UNITED STATES PATENTS

| | | |
|---|---|---|
| 2,709,205 | Colls | May 24, 1955 |
| 2,714,136 | Greenwood | July 26, 1955 |
| 2,724,795 | Rusler | Nov. 22, 1955 |
| 2,751,494 | Gray | June 19, 1956 |